Jan. 26, 1954

E. E. JOHNSON 2,667,021

PEANUT HARVESTER

Filed May 28, 1949

INVENTOR.
Edwin E. Johnson,
BY Victor J. Evans & Co.
ATTORNEYS

Jan. 26, 1954     E. E. JOHNSON     2,667,021
PEANUT HARVESTER
Filed May 28, 1949                                            4 Sheets-Sheet 2
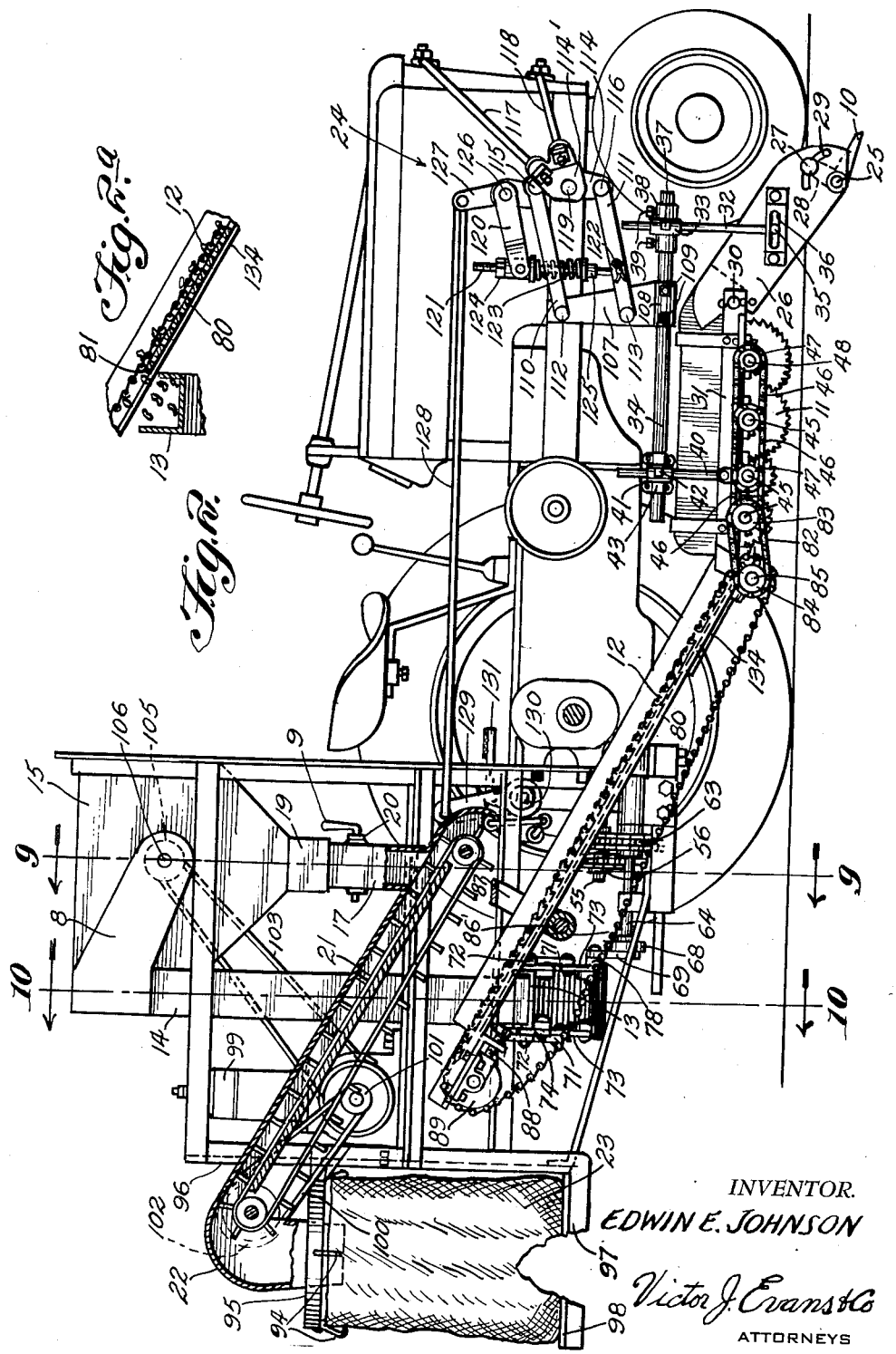
INVENTOR.
EDWIN E. JOHNSON
Victor J. Evans & Co
ATTORNEYS

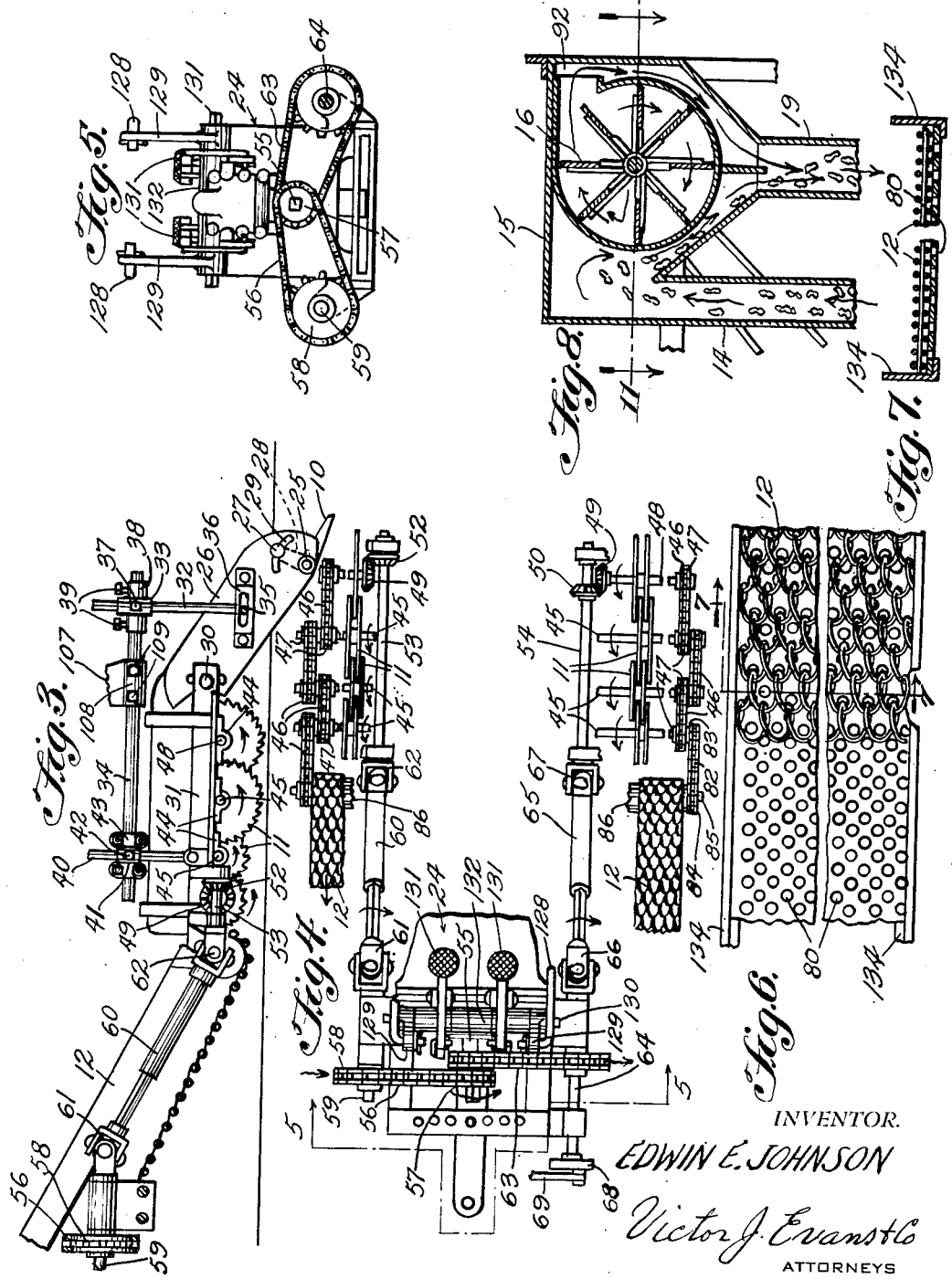

Jan. 26, 1954
E. E. JOHNSON
PEANUT HARVESTER
2,667,021
Filed May 28, 1949
4 Sheets-Sheet 4
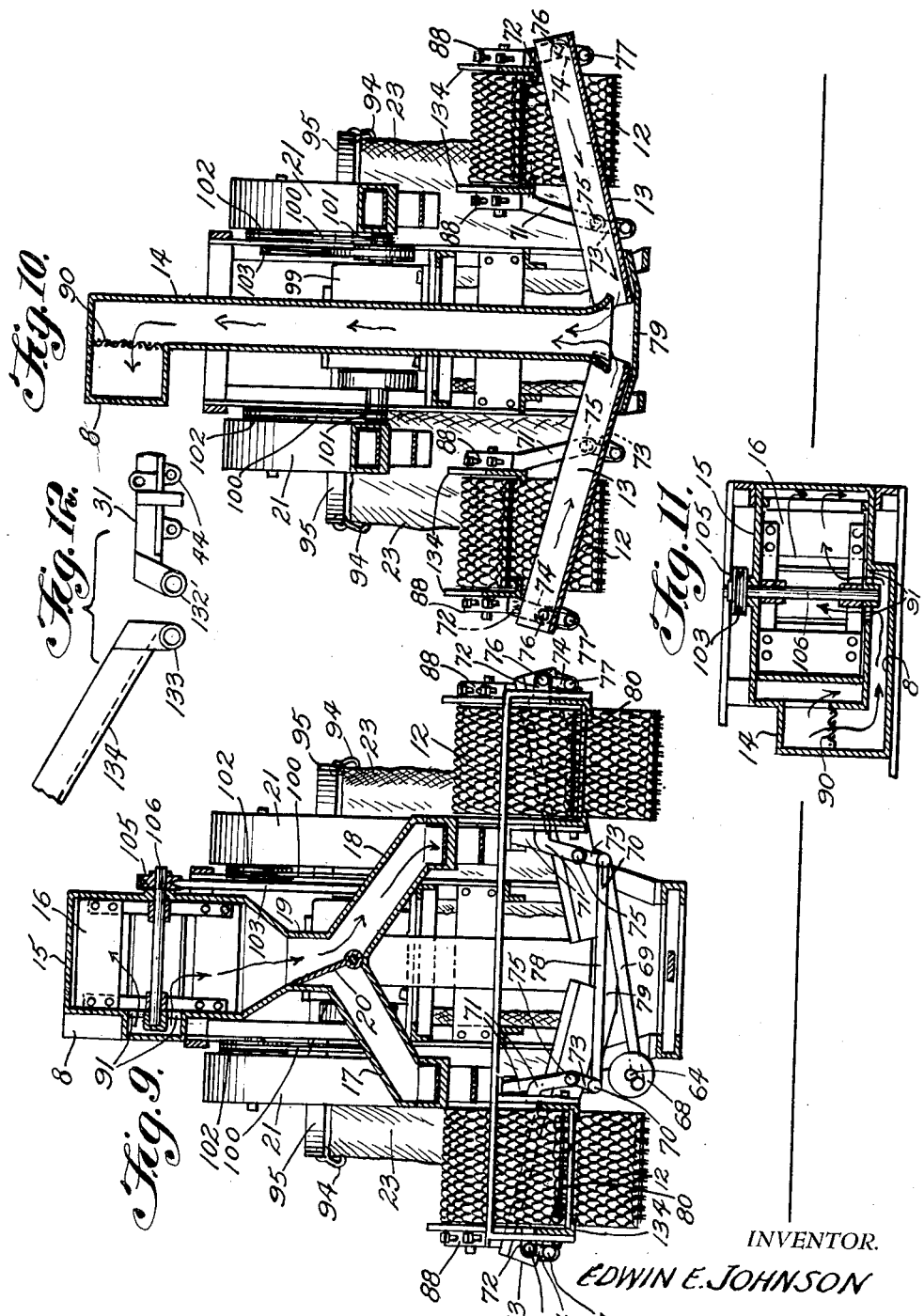
INVENTOR.
EDWIN E. JOHNSON
Victor J. Evans
ATTORNEYS Patented Jan. 26, 1954

2,667,021

UNITED STATES PATENT OFFICE 2,667,021

PEANUT HARVESTER

Edwin E. Johnson, Samson, Ala.

Application May 28, 1949, Serial No. 96,031

7 Claims. (Cl. 55—51)

This invention relates to machines for harvesting peanuts and in particular a machine that scoops mature peanuts including peanuts detached from the vines from the ground, separates the soil, vines and trash from the nuts, carries the nuts upwardly by suction to a hopper and distributes the clean nuts to sacks.

The purpose of this invention is to provide a complete peanut harvester wherein a digging blade removes the nuts from the ground so that all of the nuts of a vine including the nuts detached from the vines are reclaimed and whereby the nuts remain in the ground until all of the nuts of a vine are mature and seasoned.

In the conventional method of harvesting peanuts the nuts are threshed from vines after the vines dry in windrows or in stacks around poles and by this method many nuts are lost as by the time the nuts at the ends of the roots are mature the nuts close to the stem of the vine drop away from the vine.

In the process of growing the peanuts small nodules form on the roots of the vines, and these nodules go back into the soil enriching the soil as the nuts mature. To harvest the nuts before they are mature, therefore, depletes the soil, whereas by permitting the nuts to mature the soil is enriched.

With these thoughts in mind this invention contemplates an improved method of harvesting and sacking peanuts whereby the nuts remain in the ground until all of the nuts of a vine are mature.

Conventional methods of harvesting peanuts postulates the necessity of picking the peanuts from the vines.

Hence the necessity of digging peanuts before they are fully mature, since the nuts begin to mature around the tap root and mature progressively toward the ends of the roots.

As the peanuts mature they immediately detach themselves from the vines.

So by conventional methods one is assured of only a portion of the potential crop.

With a machine that harvests peanuts when they are fully mature the soil is not depleted, but actually built up, by allowing the nodules to go back to the soil.

This invention relates to a new method and machine for harvesting peanuts. It involves a process of extracting peanuts from the ground and separating them from dirt, litter, rocks, and other foreign material, and sacking them up, thus eliminating the conventional and wasteful process of picking the peanuts from the vines when only the nuts around the stems of the vines are mature and while the nuts toward the ends of the roots of the vines are only partly formed.

With the machine of this invention the mature nuts are scooped up by a digger blade from which they are deposited upon staggered saws which remove dirt and the like and are then conveyed to a fan in an elevated position whereby the nuts are elevated by suction to a bin from which they are deposited into sacks by gravity.

The object of this invention is, therefore, to provide means for separating dirt, trash and the like from peanuts whereby the nuts are substantially clean and the clean nuts are deposited into bags.

Another object of the invention is to provide an improved method of reclaiming peanuts in which all of the nuts of a vine are ripened in the ground and the last nuts of the vines are harvested with the mature nuts close to the stem.

A further object of the invention is to provide a complete peanut harvesting machine which permits all nuts of a peanut vine to mature in the ground and which digs, cleans, and sacks the nuts which is of a simple and economical construction.

With these and other objects and advantages in view the invention embodies a complete peanut harvesting machine having a digger blade, a dirt removing section including staggered toothed discs positioned to follow the digger blade, conveying means positioned to receive nuts from the toothed disc section, a transverse chute positioned to receive nuts from the former conveyor, a hopper having a suction fan therein, a vertical chute extended from the transverse chute to the hopper through which nuts are drawn by suction of the fan to the hopper leaving rocks to fall to the ground, and means conveying nuts from the hopper to bags.

Other features and advantages of the invention will appear from the following description taken in connection with the drawings wherein:

Figure 2 is a side elevational view of the machine with parts in section and with the wheel on the near side of the machine removed.

Figure 2a is a detail showing the peanuts dropping off of the end of a perforated plate of a wire mesh elevator.

Figure 3 is a detail illustration of the mounting of the digger blade in relation to the toothed disc section and elevator.

Figure 4 is a plan view of the toothed disc section illustrated in Figure 3 showing the staggered toothed discs or saws with the means for driving the toothed disc section from the power take off of a tractor.

Figure 5 is a section taken on line 5—5 of Figure 4 showing the transverse drives from the power take off to operating shafts at the sides of the toothed disc sections.

Figure 6 is a detail showing a plan view on an enlarged scale of one of the peanut carrying elevators showing the wire mesh belts for dragging the peanuts over the perforated plates.

Figure 7 is a cross section through the elevator taken on line 7—7 of Figure 6.

Figure 8 is a longitudinal section taken on line 8—8 of Figure 1 showing the suction fan in the upper end of the hopper.

Figure 9 is a cross section through the hopper and distributing chutes at the lower end thereof, being taken on line 9—9 of Figure 2.

Figure 10 is a cross section through the machine taken on line 10—10 of Figure 2 showing the chute through which the peanuts are drawn by the suction fan shown in Figures 8 and 9.

Figure 11 is a sectional plan through the suction fan and hopper being taken on line 11—11 of Figure 8.

Figure 12 is a detail illustration on an enlarged scale of the connections between the toothed disc section and elevator.

Figure 1:
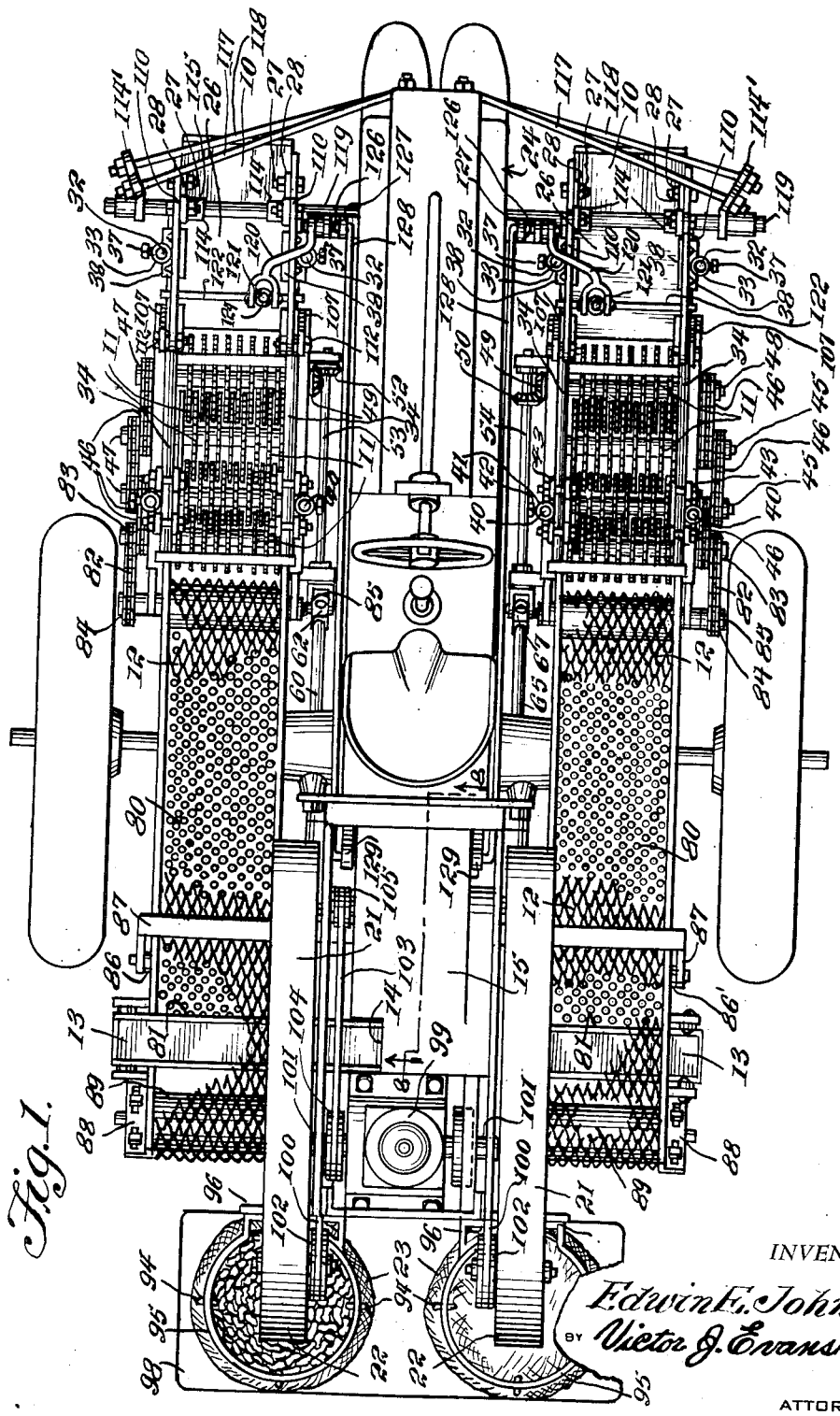
Figure 1 is a plan view of the peanut harvesting machine, with parts broken away.

Referring now to the drawings wherein like reference characters denote corresponding parts the complete harvester of this invention includes a digger blade 10, a separator unit including a plurality of staggered toothed discs or saws 11, an endless wire mesh chain inclined conveyor or elevator 12, a transverse chute 13, a vertical chute or peanut elevator 14, a hopper 15 having a fan 16 therein, distributing chutes 17 and 18 extended from a throat 19 of the hopper, with a valve 20 in the throat, and a conveyor 21 for carrying peanuts from the chute 17 to a bag filling hopper 22 by which bags as indicated by the numeral 23 are filled. The harvester elements are mounted on a tractor 24.

The elements 10, 11, 12, 13, 21 and 22 are duplicated on both sides of the machine and the same reference characters are applied to both.

It will be understood that a harvester may be provided with the two duplicate units as illustrated in the drawings and both units may be operated simultaneously, or one unit may be operated independently and for small peanut growers only one unit may be used.

The digger blade 10 is pivotally mounted on a shaft 25 in the outer end of a chute 26 and the position of the blade 10 is controlled by nuts 27 on arms 28, the nuts being positioned in arcuate slots 29 in the sides of the chute 26.

The chute 26 is pivotally mounted on a shaft 30 in a frame 31 and the elevation of the digger blade 10 is controlled by rods 32 slidably mounted in sockets 33 which are secured to clamps 38 mounted on shafts 34. Pins 35 at the lower ends of the rods 32 are positioned in elongated slots in brackets 36 on the sides of the chute. The rods 32 are adjustably held in the sockets 33 by set screws 37 and the sockets are carried by clamps 38 having bolts 39 therein whereby the positions of the clamps on the shafts 34 are adjustable.

The frame 31 is suspended from the shafts 34 by similar rods 40 that are held in sockets 41 by set screws 42 and the sockets are held on clamps 43 by which the positions thereof on the shafts 34 are adjustable.

Both sides of the frame 31 are provided with bearings 44 in which a plurality of spaced shafts 45 and an end shaft 48 are journaled. A plurality of toothed discs 11 are mounted on each of said shafts. The shaft 48 and the bevel gear 49 mounted thereon are driven by shaft 50 through a bevel gear 54 mounted thereon. A sprocket 47 is mounted on each of the shafts 45 and 48 and trained over said sprockets are chains 46 which serve to drive the sprocket 47, shafts 45 and the discs 11 mounted thereon.

A similar toothed disc unit is provided on the opposite side of the machine and this is driven by a gear 52 similar to the gear 50, the gear 52 being mounted on a shaft 53 and the gear 50 being mounted on a shaft 54. The shaft 53 is driven from a power take off shaft 55 of the tractor 24 by a chain 56 which is trained over sprockets 57 and 58 with the sprockets mounted on the jack shaft 59 and driving the shaft 53 through a telescoping section 60 with universal joints 61 and 62 at the ends thereof. The shaft 54 is driven in a similar manner by a chain 63 which drives the jack shaft 64 and the jack shaft drives the shaft 54 through a telescoping section 65 with universal joints 66 and 67 at the ends thereof.

The shaft 64 is provided with an eccentric 68 that is connected by an arm 69 to the chutes 13 through a pin 70 with the chutes suspended by hangers 71 and 72 through links 73 and 74 the upper ends of which are pivotally connected to the hangers by pins 75 and 76, and the lower ends to the chutes by the pin 70 and also by pins 77. A link 78 connects the pins 70 of the chutes on the opposite sides of the machine. By this means the chutes 13 are continuously vibrated to facilitate nuts thereon sliding to a receiving tray 79 at the center from which the nuts are picked up by suction of the fan 16 and carried through the vertical chute 14 with the rocks remaining in the tray and falling therefrom to the ground.

The elevators 12 are formed with endless wire mesh, as illustrated in Figure 6 and the wire mesh travels upwardly over a perforated plate 80, which terminates at the point 81 whereby nuts carried upwardly by the wire mesh drop by gravity on the chutes 13 from where they are carried by the vibration of the chutes 13 to the tray 79 from which they are picked up by suction of the fan 16 and conveyed to the hopper 15. The elevator 12 is driven by a chain 82 which is trained over sprockets 83 and 84, as shown in Figure 4. The sprocket 84 is mounted on a shaft 85 on which the roller 86 that drives the elevator 12 is mounted.

The upper end of the elevator 12 is carried by a roller 86', similar to the roller 86 at the lower end of the endless wire mesh conveyor, on a bracket 87 whereby the elevator is free to travel upwardly and downwardly as the position of the toothed disc is adjusted. The upper end of the elevator 12 is provided with a take-up 88 in which the upper roller 89 of the elevator is journaled.

The upper end of the vertical chute 14 opens into the side of the hopper 15 through a duct 8 and a screen 90 may be provided in the hopper to deflect the peanuts drawn upwardly by suction of the fan 16, downwardly as shown in Figure 8 and the air is discharged through an opening 92 downwardly through the chute 19.

The suction of the fan 16 draws air with the peanuts suspended therein upwardly with the peanuts dropping through the throat 19 of the hopper and the suction is sufficient to lift the peanuts whereas the rocks and the like, which are comparatively heavy remain on the tray 79, from which they drop to the ground. The position of the valve 20 is adjusted by the handle 9, to permit the peanuts to drop into the chutes 17 or 18.

From the chute 17 the peanuts are carried by the conveyor 21 to the hopper 22 from which they are deposited into a sack 23 supported by hooks 94 on a ring 95 that extends outwardly from the rear portion of the frame 96. The frame is provided with outwardly extended arms 97 upon which a platform 98 is positioned as shown in Figure 2.

In the design shown, a motor 99 is provided for driving the conveyor 21 and fan 16 and the conveyor is driven by a belt 100 that is trained over pulleys 101 and 102. The fan 16 is driven by a belt 103 that is trained over pulleys 104 and 105, the pulley 105 being mounted on the shaft 106 of the fan 16.

It will be understood that the conveyor may be driven by other suitable means.

The rods 34 from which the digger blade 10 and toothed discs or saws 11 are suspended are supported from the frame of the tractor by brackets 107 which have hubs 108 on the lower ends in which the rods 34 are adjustably held by set screws 109. The brackets 107 are carried by pairs of parallel arms 110 and 111 which are pivotally mounted on the brackets at the points 112 and 113 and pivotally mounted on supports 114 at the points 115 and 116. The supports 114 are mounted in brackets 114' which are held by brace bars 117 and 118, as shown in Figures 1 and 2.

The brackets 114' are carried on a bar 119 that extends outwardly from the side of the tractor and the elevation of the digger blade and toothed disc unit is controlled by a yoke 120 through a post 121 with the lower end of the post connected to a rod 122 extended through lower arms 111. A spring 123 on the post 121 is held between an upper nut 124 and a lower nut 125 permits upward movement of the digger blade 10 should the blade strike an obstruction.

The yoke 120 is mounted on a shaft 126 and an arm 127 on the shaft is connected by a rod 128 to an arm 129 on a shaft 130 which is controlled by a foot pedal 131, as shown in Figure 4. The shaft 130 is journaled in a bearing 132 mounted on the frame and as the foot pedal 131 is pressed downwardly the arm 127 moves forwardly, raising the post 121 and thereby lifting the digger blade 10 from the ground.

The inner end of the frame 31 on the outer end of which the digger blade 10 is carried is pivotally mounted, through a bearing 132' on the end thereof on the shaft 85 which is journaled in bearings 133 carried by the lower end of the frame 134 of the elevator 12, as illustrated in Figure 12. The frame 31 is supported from the rods 34 and with the shaft 85 journaled in the bearing 132 the lower end of the elevator 12 is supported from the frame 31 with the outer part resting upon the roller 86.

With the parts arranged in this manner a single unit or a pair of units are mounted on a tractor or chassis and drawn along a row of peanuts in a field and as the peanuts are removed from the ground they pass upwardly through the chute 26 to the saw or toothed disc separator unit where the discs separate the soil from the nuts, and with the discs rotating in counter-clockwise directions the nuts travel over the saws with a floating or jumping action, and are fed rearwardly to the elevator 12 where the wire mesh chain thereof carries the nuts upwardly over the perforated plate 80 with small particles of dirt, dust and the like passing through the perforations and with the peanuts dropping from the upper end of the perforated plate into the transverse vibrating chute 13. The nuts are delivered from the vibrating chute 13 to the tray 79 and the suction fan or blower 16 draws the nuts upwardly through the vertical chute 14 leaving the rocks, and being deposited into the upper hopper 15 from which they drop downwardly to the baffle or valve 20 which is adjusted by the handle 9 to permit the peanuts to drop downwardly into one of the chutes 17 or 18. From these chutes the peanuts are conveyed by a conveyor 21 to a suitable point for sacking and the peanuts may be directed to sacks alternately by conventional means whereby one sack is closed and removed as another is being filled.

It will be understood that a fan of a different design may be used.

It will also be understood that the harvester may be provided as a self contained or independent implement, or attached to a tractor or the like, as may be desired.

It will be understood that modifications may be made in the design and arrangement of the parts without departing from the spirit of the invention.

What is claimed is:

1. A peanut harvester comprising a plurality of toothed discs positioned in staggered relation, spaced horizontally disposed parallel shafts on which the toothed discs are mounted providing a soil and trash separator unit, a frame in which the shafts are journaled, a digger blade carried by the forward end of the separator unit, an inclined perforated plate extended upwardly from the rear end of the separator unit, an endless wire mesh chain traveling over the perforated plate for dragging products over the plate, an elevator mounted in the frame and positioned to receive peanuts from the wire mesh chain, and means operatively connected to the elevator for feeding peanuts from the elevator to containers.

2. A peanut harvester comprising a plurality of toothed discs positioned in staggered relation, spaced horizontally disposed parallel shafts on which the toothed discs are mounted providing a soil and trash separator unit, a frame in which the shafts are journaled, a digger blade carried by the forward end of the separator unit, an inclined perforated plate extended upwardly from the rear end of the separator unit, an endless wire mesh chain traveling over the perforated plate for dragging products over the plate, a chute extended from the digger blade to the separator unit, an elevator mounted in the frame and positioned to receive peanuts from the wire mesh chain, and means operatively connected to the elevator for feeding peanuts from the elevator to containers.

3. A peanut harvester comprising a plurality of toothed discs positioned in staggered relation, spaced horizontally disposed parallel shafts on which the toothed discs are mounted providing a soil and trash separator unit, a frame in which the shafts are journaled, a digger blade carried by the forward end of the separator unit, an inclined perforated plate extended upwardly from the rear end of the separator unit, an endless wire mesh chain traveling over the perforated plate for dragging products over the plate, a chute extended from the digger blade to the separator unit, means adjusting the elevation of the chute and digger blade, an elevator mounted in the frame and positioned to receive peanuts from the wire mesh chain, and means operatively connected to the elevator for feeding peanuts from the elevator to containers.

4. A peanut harvester comprising a plurality of toothed discs positioned in staggered relation, spaced horizontally disposed parallel shafts on which the toothed discs are mounted providing a soil and trash separator unit, a frame in which the shafts are journaled, an inclined chute carried by and pivotally attached to the forward end of the unit, a digger blade carried by the forward end of the inclined chute, an inclined perforated plate extended upwardly from the rear end of the separator unit, an endless wire mesh chain traveling over the perforated plate for dragging products over the plate, means adjusting the elevation of the digger blade, an elevator carried by the rear end of the separator unit, and means for feeding peanuts from the separator unit to containers.

5. A peanut harvester comprising a plurality of toothed discs positioned in staggered relation on spaced horizontally disposed parallel shafts providing a soil and trash separator unit, an inclined chute carried by and pivotally attached to the forward end of the unit, a digger blade carried by the forward end of the inclined chute, means adjusting the elevation of the digger blade, an inclined perforated plate extended upwardly from the rear end of the separator unit, an endless wire mesh chain traveling over the perforated plate for dragging peanuts over the plate, a vertical chute carried by the frame of the machine, a transverse chute extended from the upper end of the perforated plate to the vertical chute, a hopper at the upper end of the vertical chute, a suction fan in the hopper for drawing peanuts upwardly from the transverse chute through the vertical chute, and means feeding peanuts from the hopper to containers.

6. A peanut harvester comprising a plurality of toothed discs positioned in staggered relation on spaced horizontally disposed parallel shafts providing a soil and trash separator unit, an inclined chute carried by and pivotally attached to the forward end of the unit, a digger blade carried by the forward end of the inclined chute, means adjusting the elevation of the digger blade, an inclined perforated plate extended upwardly from the rear end of the separator unit, an endless wire mesh chain traveling over the perforated plate for dragging peanuts over the plate, a vertical chute carried by the frame of the machine, a transverse chute extended from the upper end of the perforated plate to the vertical chute, a hopper at the upper end of the vertical chute, a suction fan in the hopper for drawing peanuts upwardly from the transverse chute through the vertical chute, means vibrating the transverse chute, and means feeding peanuts from the hopper to containers.

7. A peanut harvester comprising a plurality of toothed discs positioned in staggered relation on spaced horizontally disposed parallel shafts providing a soil and trash separator unit, an inclined chute carried by and pivotally attached to the forward end of the unit, a digger blade carried by the forward end of the inclined chute, means adjusting the elevation of the digger blade, an inclined perforated plate extended upwardly from the rear end of the separator unit, an endless wire mesh chain traveling over the perforated plate for dragging peanuts over the plate, a vertical chute carried by the frame of the machine, a transverse chute extended from the upper end of the perforated plate to the vertical chute, a hopper at the upper end of the vertical chute, a suction fan in the hopper for drawing peanuts upwardly from the transverse chute through the vertical chute separating the peanuts from rocks and the like, and means feeding peanuts from the hopper to containers.

EDWIN E. JOHNSON.

References Cited in the file of this patent
UNITED STATES PATENTS

| Number | Name | Date |
|---|---|---|
| 812,007 | Bowman | Feb. 6, 1906 |
| 1,014,493 | Lauritzen et al. | Jan. 9, 1912 |
| 1,015,110 | Willis | Jan. 16, 1912 |
| 1,251,425 | Rogers et al. | Dec. 25, 1917 |
| 1,389,526 | Newton | Aug. 30, 1921 |
| 1,458,044 | Ford | June 5, 1923 |
| 1,816,999 | Esminger | Aug. 4, 1931 |